United States Patent [19]
Wyss

[11] 3,999,229
[45] Dec. 28, 1976

[54] DOUBLE JOINT ASSEMBLY

[76] Inventor: André Wyss, Fontanette 30, 2024 Sauges-pes-St.-Aubin, Switzerland

[22] Filed: Aug. 13, 1975

[21] Appl. No.: 604,195

[52] U.S. Cl. .................................... 5/99 A; 5/111
[51] Int. Cl.² .................. A47C 29/00; A47C 19/16
[58] Field of Search ............ 5/99 R, 110, 112, 114, 5/111; 297/52

[56] References Cited
UNITED STATES PATENTS
893,364 7/1908 Piaser ..................................... 5/111

FOREIGN PATENTS OR APPLICATIONS
409,653 2/1910 France ..................................... 5/111
1,108,338 8/1955 France ..................................... 5/111

Primary Examiner—Paul R. Gilliam
Assistant Examiner—Andrew M. Calvert
Attorney, Agent, or Firm—Imirie, Smiley & Linn

[57] ABSTRACT

A double joint assembly for interconnecting three elements of a foldable structure, two elements being capable of pivoting in the same plane so as to be located at a pre-selected angle to the third element, the joint assembly comprising a forked member, a clamping member and a bolt member, each of which members is integral with, or affixable to one of the said elements, the clamping member and the bolt member each having a flat portion which is pivotable about a pivot axis and which is located in an aperture formed in the forked member, each flat portion having a cam surface formed thereon having at least one support surface, that the clamping member abuts against one surface of the forked member when the foldable structure is extended, the cam surface of the bolt member co-operating with the cam surface of the clamping member such that, in use, the clamping member is retained in position relative to the forked member in two directions, the angular position of the bolt member being determined by the angle at which its support surface abuts against one of the surfaces of the clamping member.

3 Claims, 4 Drawing Figures

U.S. Patent  Dec. 28, 1976  3,999,229
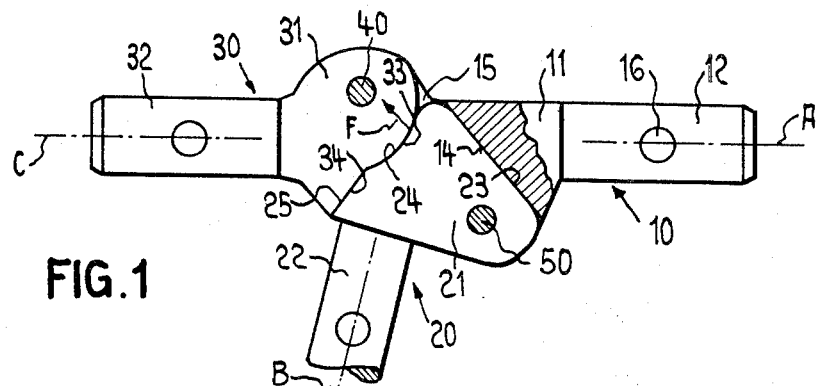
FIG.1
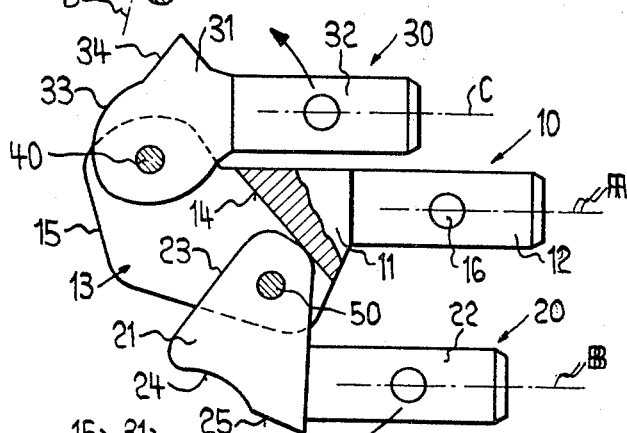
FIG.2
FIG.3
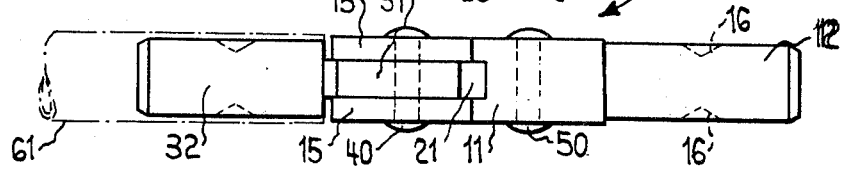
FIG.4
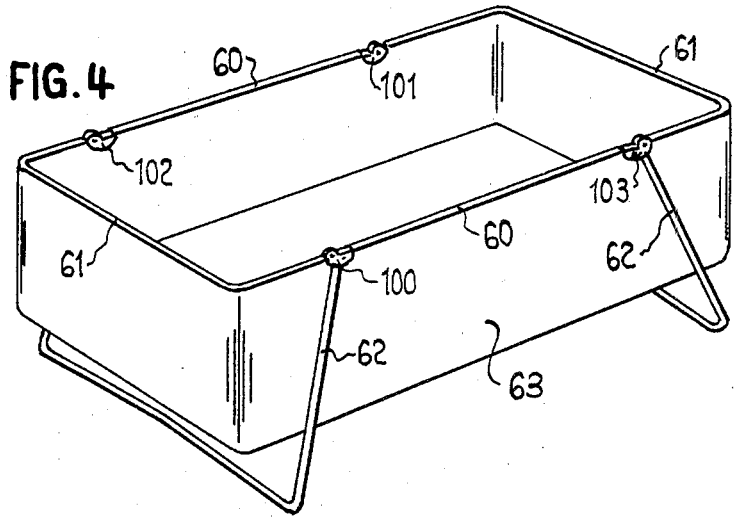

DOUBLE JOINT ASSEMBLY

BACKGROUND OF THE INVENTION

The present invention relates to a double joint for connecting three elements of a foldable structure, two of the elements being capable of pivoting in an identical plane and being locatable at a desired angle in relation to the third.

Double joints are utilised for connecting together three elements of a foldable assembly, such as a camping table or an infant's cot and should preferably exhibit the following characteristics. Firstly, in the position of use, one of the elements should be locked in position in a relatively simple manner, relative to the other two elements. Secondly, the three elements must remain in the same plane (irrespective of whether they are in their locked position or not). Thirdly, the joint must be relatively resistant to forces which are applied perpendicularly to the plane containing the elements. Fourthly, the thickness of the joint should be approximately the same as the thickness of the other elements of the foldable structure, and finally, it should be almost impossible for a user to trap his fingers when closing the joint.

A double joint is known in which locking of the joint is possible. In such a joint a first element has a nose portion integral therewith. In a particular position of the joint, this nose portion engages in a groove formed in a part which is formed integrally with a second element of the joint. The first and second elements pivoting relative to a member which is connected to a third element of the joint. However, in such an arrangement, the joint can only be unlocked in one position. Additionally the nose portion generally has sharp edges which can injure the user.

SUMMARY OF THE INVENTION

According to the present invention, there is provided a double joint assembly for interconnecting three elements of a foldable structure, two elements being capable of pivoting in the same plane so as to be located at a pre-selected angle to the third element, the joint assembly comprising a forked member, a clamping member and a bolt member each of which members is integral with or affixable to one of the said elements, the clamping member and the bolt member each having a flat portion which is pivotable about a pivot axis and which is located in an aperture formed in the forked member, each flat portion having a cam surface formed thereon and having at least one support surface, such that the clamping member abuts against one surface of the forked member when the foldable structure is extended, the cam surface of the bolt member cooperating with the cam surface of the clamping member such that, in use, the clamping member is retained in position relative to the forked member in two directions, the angular position of the bolt member being determined by the angle at which its support surface abuts against one of the surfaces of the clamping member.

The invention will be further described, by way of example, with reference to the accompanying drawings.

BRIEF DESCRIPTION OF THE DRAWINGS

FIG. 1 is a side elevational view of a double joint in accordance with the present invention in its extended position;

FIG. 2 is a view similar to FIG. 1 showing the joint in its collapsed position;

FIG. 3 is a plan view of the joint FIG. 1 in its extended position; and

FIG. 4 is a perspective view of a cot embodying four joints in accordance with the present invention.

DESCRIPTION OF THE PREFERRED EMBODIMENT

A double joint in accordance with the present invention comprises five main components which are a forked member 10 a clamping member 20, a bolt member 30 and spindles 40 and 50.

The forked member 10 comprises a flat portion 11 having a polygonal contour, one face of which has connected thereto or integrally formed therewith, a cylindrical extension portion 12. The portion 10 has an aperture 13 formed therein, the lower surface defining the aperture subtending an acute angle with the longitudinal axis A of the extension portion 12. Wing portions 15, best seen in FIG. 3, of the member 10 are produced by the provision of the aperture 13. These portions 15 are sufficiently thick to ensure that they are relatively rigid.

Two bores, through which the spindles 40 and 50 are passed are formed in each of the wing portions 15 the bores formed in one wing portion being aligned with the bores formed in the other wing portion.

The clamping member 20 and the bolt member 30 each comprise a flat portion 21 and 31 respectively; each flat portion having connected thereto, or integrally formed therewith, a cylindrical extension portion 22 and 32 respectively. One surface of each of the flat portions is shaped to form a cam surface, these being referenced 24 and 33 respectively. Associated with each cam surface is at least one support surface these being the surface 34 of the bolt member 30 and the surfaces 23 and 25 of the clamping member 20. The thickness and tolerances of these flat portions 21 and 31 are so selected that they are freely pivotable in the aperture 13 formed in the forked member 10, the pivot axes being the spindles 40 and 50 respectively.

The double joint is assembled by rivetting or forcefitting the spindles into the forked member 10. Three tubes, which form elements of the foldable structure, are then fitted to the cylindrical portions 12, 22 and 32 by appropriate means. Thus, for example, tapers 16 may be provided on the cylindrical portions 12, 22 and 32, onto which the elements may be stuck, screwed or rivetted.

In the position shown in FIGS. 1 and 3, the longitudinal axes A and C of the cylindrical portions 12 and 32 lie on the same straight line and the thickness of the forked member 10 corresponds substantially to the diameter of the tubes forming elements of the foldable structure.

FIG. 2 shows the double joint in the folded state. In order to extend it, the clamping member 20 is pivoted (in the direction indicated by the arrow adjacent thereto in FIG. 2) until the support surface 23 associated with the cam surface 21 rests against the bottom surface 14 of the aperture 13 in the formed member 10. In the embodiment shown in FIG. 1, the longitudinal axis B of the portion 22 subtends an angle of 112° with the longitudinal axis A. The bolt portion 30 is then pivoted until the surface 34 comes into abutment with the surface 25 of the clamping member 20. In this position the clamping member is locked in position. It is prevented from movement in one direction by the bottom surface of the aperture 13, and in the other direction by the cam surfaces 24 and 33. If a moment is applied to the clamping member 20, a resultant force F is produced which acts in the direction indicated in FIG. 1. The shaping of the surfaces 24 and 33 of the cams are so produced that this resultant force F creates, on contact with the two cams, a moment tending to retain bolt member 30 in its extended position. The angular location of the bolt member is determined by the abutment of its support surface 34 against the support surface 25 of the clamping member.

To collapse the structure, the bolt member 30 is pivoted in a clockwise direction, and then the clamping member 20 pivoted anticlockwise.

The members 10, 20 and 30 can each be produced from plastic material or from injected metal. In a preferred embodiment, the clamping bolt and forked members are each made from stamped and formed sheet iron each member being formed in two parts which are assembled together when assembling the joint. The spindles 40 and 50 may be tubular rivets since they merely act as pivot axes, with the aforementioned proviso that they must be sufficiently strong to prevent deformation of the joint.

In FIG. 4, there is shown, by way of example only, one application of the joint of the present invention. The joint is used in a foldable bed for a child. To the forked member 10 of a double joint 100, there is affixed one of the ends of a rectilinear tube 60. To the clamping member 20, one of the ends of a first U-shaped tube 62 is affixed and to the bolt member 30, one end of a second U-shaped tube 61 is affixed. It will readily be seen that the assembly of the tubes 61, 62 and 63 forms half of the foldable structure. Completely assembled, the foldable bed thus comprises two tubes 60, two tubes 62, and two tubes 63, and four double joints 100, 101, 102 and 103, two of which joints 102 and 103 form the connection between the two halves of the foldable structure. The length of the arms of each U is small in relation to the spacing therebetween.

In the above example, the double joints interconnect tubes of circular cross-section. It is obvious that other arrangements may be interconnected by joints in accordance with the present invention. Moreover, the angular relationship of the axes A, B and C with one another may be varied from the figures given hereinbefore.

I claim:

1. A double joint assembly having extended and folded positions for interconnecting three elements of a foldable structure, at least two of said elements being pivotable with respect to and in the same plane as said third element, one of said pivotable elements being locatable at a predetermined angle relative to said other two elements, comprising a forked member having a flat portion and two wing portions, said flat portion and said wing portions defining a substantially U-shaped cross-sectional channel section, said wing portions having two spaced-apart pivot axes extending therebetween, a clamping member pivotally mounted on a first of said pivot axes, and a bolt member pivotally mounted on a second of said pivot axes, said clamping member and said bolt member each having a flat portion which is located in said channel section formed in the forked member, each said flat portion of said clamping member and said bolt member having a cam surface and at least one support surface formed thereon, each of said members being connectable to or integral with one of said elements of said foldable structure, such that, when said foldable structure is extended, said cam surface of said bolt member co-operates with said cam surface of said clamping member and a further surface of said clamping member abuts one surface of said forked member to lock said clamping member in position relative to said forked member in two directions, said cam surfaces of said clamping member and said bolt member being disposed with respect to the pivot axes thereof such that when the joint assembly is extended and a moment is applied to said clamping member to fold the same, said cam surface of said clamping member engages said cam surface of said bolt member to produce a resultant force which acts in a direction to maintain said bolt member in its extended, locking position.

2. A foldable structure comprising four double joint assemblies as claimed in claim 1, the forked member of each said joint being connected to or integral with one end of one of two rectilinear tubular members, the clamping member of each said joint being connected to or integral with one end of one of two U-shaped members and each said bolt member being connected to or integral with one end of one of two further U-shaped members, said further U-shaped members have a base width which is relatively large relative to the length of the arms of the U.

3. The double joint assembly as recited in claim 1, wherein the angular position of said bolt member with respect to said other two members in the extended position is determined by the angle assumed by said bolt member when said support surface of said bolt member abuts against said support surface of said clamping member.

* * * * *

UNITED STATES PATENT AND TRADEMARK OFFICE
CERTIFICATE OF CORRECTION

PATENT NO. : 3,999,229
DATED : December 28, 1976
INVENTOR(S) : ANDRE WYSS

It is certified that error appears in the above-identified patent and that said Letters Patent are hereby corrected as shown below:

In the Heading:

Change inventors address from "Sauges-pes-St.-Aubin" to -- Sauges-pres-St.-Aubin --.

-- Foreign Applications Priority Data

September 13, 1974   Switzerland 12492/74 --.

Signed and Sealed this

Twenty-fifth Day of April 1978

[SEAL]

Attest:

RUTH C. MASON
Attesting Officer

LUTRELLE F. PARKER
Acting Commissioner of Patents and Trademarks